Oct. 12, 1971 W. K. MAXWELL, SR 3,611,667
METHOD OF ERECTING A BUILDING
Filed June 2, 1970 2 Sheets-Sheet 2
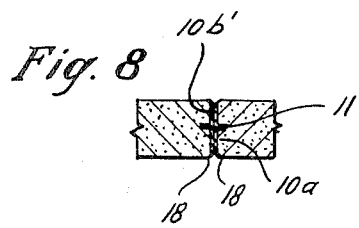
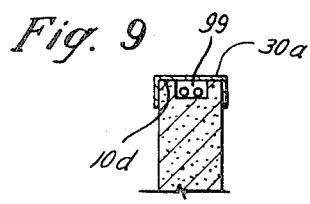
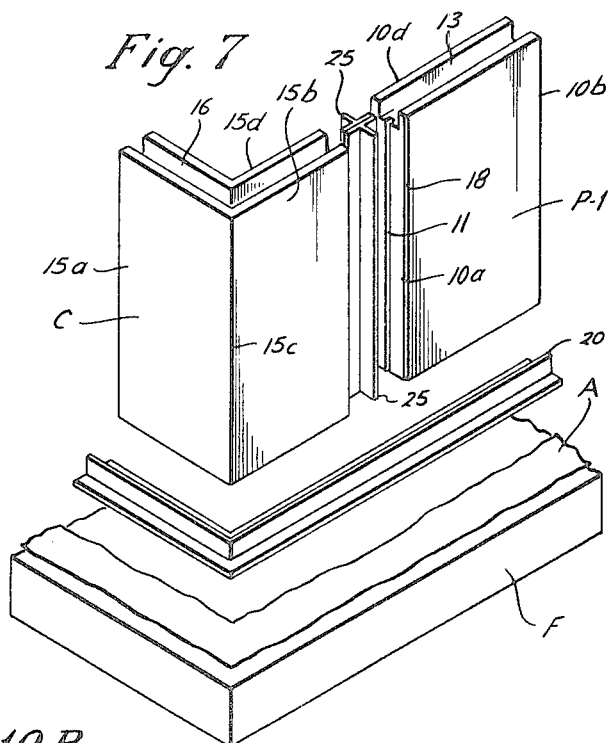
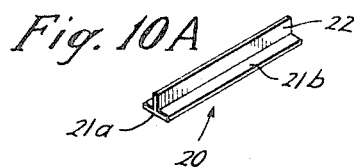
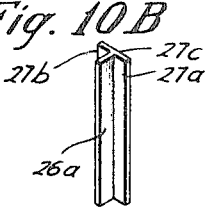
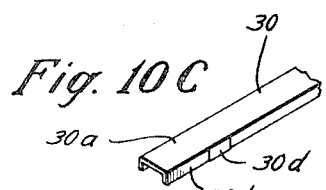
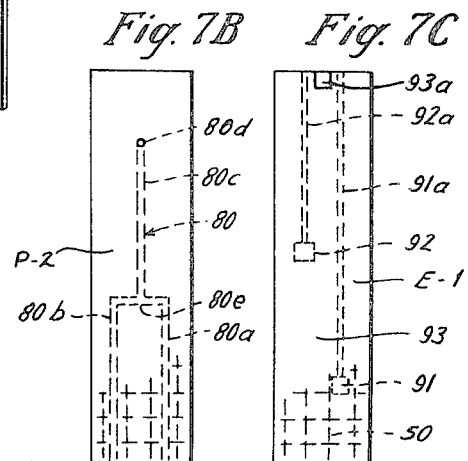
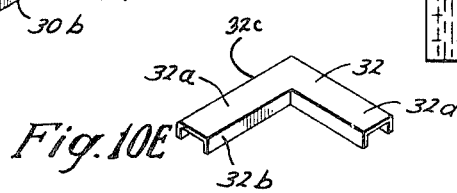
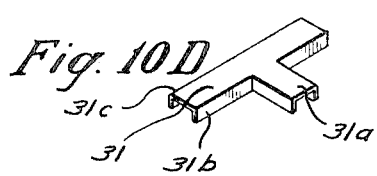
William K. Maxwell, Sr.
INVENTOR
BY
Pravel Wilson & Matthews
ATTORNEYS United States Patent Office 3,611,667
Patented Oct. 12, 1971

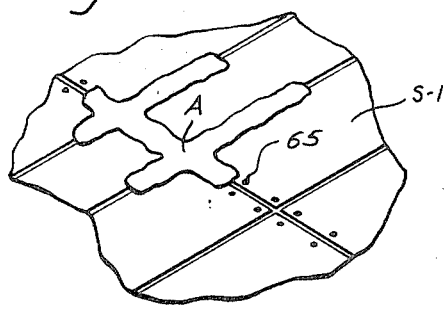
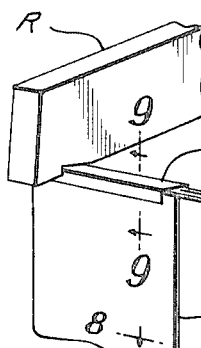
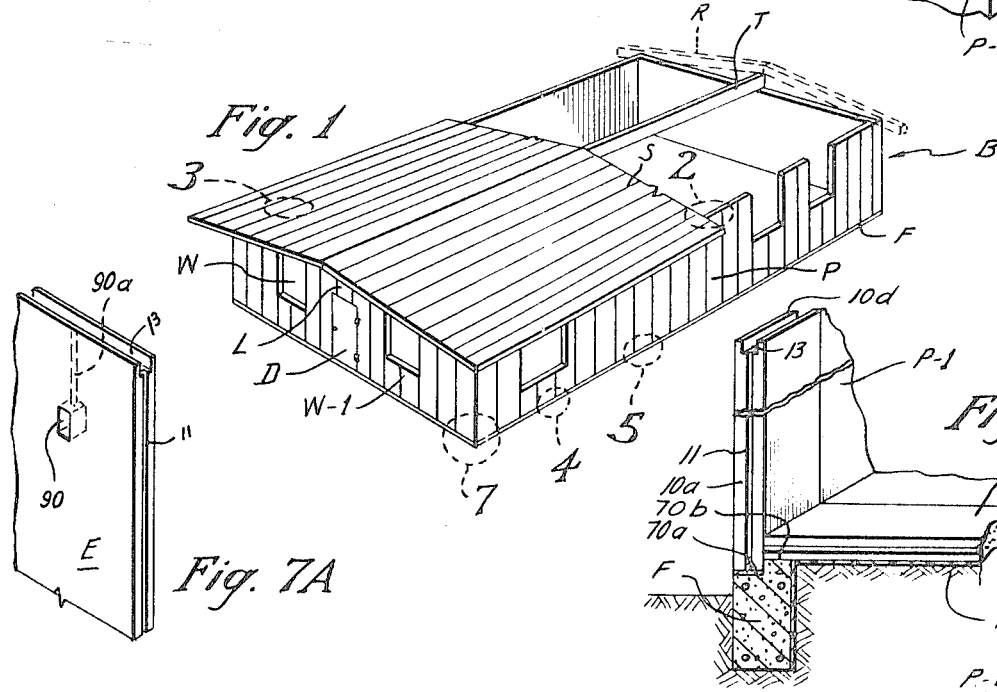
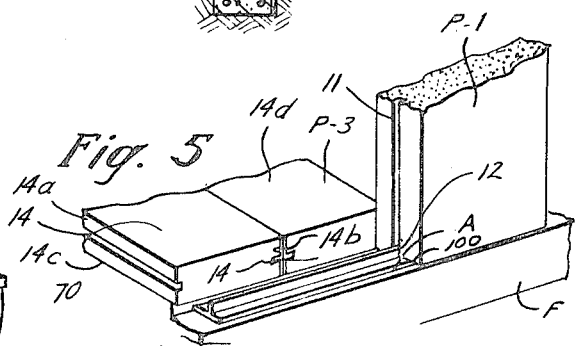
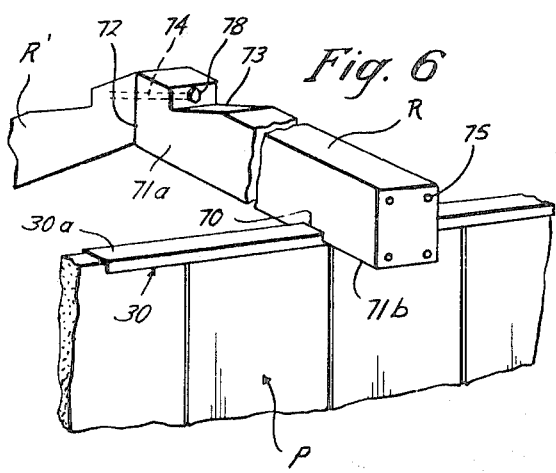

3,611,667
METHOD OF ERECTING A BUILDING
William K. Maxwell, Sr., Harris County, Tex.
(P.O. Box 36191, Houston, Tex. 77036)
Filed June 2, 1970, Ser. No. 42,822
Int. Cl. E04b 1/00
U.S. Cl. 52—747
7 Claims

ABSTRACT OF THE DISCLOSURE

A method of erecting a building by assembling a plurality of panels using adhesive mastic and splines between the panels and the foundation. Rigid bracing is used to support the panels, and each panel may include part of an electrical power system for the building. The panels are standardized and pre-cast and contain channels in the edges.

BACKGROUND OF THE INVENTION (1) Field of the invention

The present invention relates to a method for erecting a building by assembling standardized pre-cast panels.

(2) Description of the prior art

The prior art methods of assembling buildings and other structures required numerous types of skilled laborers to erect such structures. The number of types of different structural members, materials and other parts required detailed assembly instruction which were complex and involved, and caused the time required to fabricate and assemble components and erect such structures to be relatively long. In order to shorten the time required to erect such structures, and provide urgently needed new housing for an expanding population, either additional laborers or longer work hours for the regular labor crews were necessary. All of the above factors caused the prior art methods of erection of buildings to be time consuming and expensive, and thus undesirable.

SUMMARY OF THE INVENTION

Briefly, the present invention provides a new and improved method for erecting a building or other structure by assembling standardized pre-cast concrete panels in a pre-planned numerical sequence which simplifies and standardizes assembly and erection techniques, reducing the complexity and cost of erecting a building or other structure.

It is an object of the present invention to provide a new and improved method of erecting a building.

It is an object of the present invention to provide a method for erecting a building or other structure which simplifies and standardizes assembly and erection procedures and consequently reduces the time and cost requirements of erecting such a building.

BRIEF DESCRIPTION OF THE DRAWINGS

FIG. 1 is an isometric view of a building partially assembled and erected according to the method of the present invention;

FIG. 2 is an isometric view illustrating in detail the portion circled and having the numeral 2 designating same in FIG. 1;

FIG. 3 is an isometric view illustrating in detail the portion circled and having the numeral 3 designating same in FIG. 1;

FIG. 4 is an isometric view, partly in section, illustrating in detail the portion circled and having the numeral 4 designating same in FIG. 1;

FIG. 5 is an isometric view, partly in section, illustrating in detail the portion circled and having the numeral 5 designating same in FIG. 1;

FIG. 6 is an isometric view, illustrating in detail the roof supporting portion of the building B erected according to the method of the present invention;

FIG. 7 is an exploded isometric view illustrating in detail the portion circled and having the numeral 7 designating same in FIG. 1;

FIG. 7A is an isometric view of a pre-cast concrete panel and in the method of the present invention adapted to provide electric outlets;

FIG. 7B is a plan view of a pre-cast concrete panel used in the method of the present invention, adapted to provide water outlets;

FIG. 7C is a plan view of a pre-cast concrete panel used in the method of the present invention adapted to provide an electrical switch and an electrical outlet;

FIG. 8 is a cross-sectional view taken along the lines 8—8 of FIG. 2;

FIG. 9 is a cross-sectional view taken along the lines 9—9 of FIG. 2; and

FIGS. 10A, 10B, 10C, 10D and 10E are isometric views of standardized structural components used in the method of the present invention.

DESCRIPTION OF THE PREFERRED EMBODIMENT

In the drawings, the letter B designates generally a building erected according to the method of the present invention, which may be a home, store, warehouse or other structure.

The building B (FIG. 1) includes a plurality of standardized panel units P mounted at a lower end to a foundation F, and a roof S, supported by a plurality of rafters R and a support beam T, mounted at an upper end of the panel units P according to the method of the present invention.

A plurality of windows W are provided at preselected locations in the building B in accordance with the construction pattern or design instructions by the method of the present invention.

The foundation F (FIGS. 4 and 5) may be a concrete slab, stone, brick or reinforced concrete beams, and the panel units P are mounted along an upper surface 70 thereof. The upper surface 70 may comprise two surfaces 70a and 70b at different elevations (FIG. 4) along the recessed panel ledge or surface 70a of which a wall panel unit P–1 is mounted and along a second floor panel surface 70b of which a sub-floor panel P–3 may be mounted.

STANDARDIZED COMPONENTS

The standardized components adapted for use in the method of the present invention include the panel units P (FIGS. 7, 7A, 7B and 7C), splines N (FIGS. 10A and 10B), steel channel members M (FIGS. 10C, 10D and 10E), rafters R (FIGS. 1, 2 and 6), and support beam T (FIG. 1).

The standardized pre-cast panel units P may be pre-cast or preformed from concrete or other suitable material and may contain corrosion inhibited steel mesh or rods (not shown), for support, and include a corner panel unit C (FIG. 7), a wall panel unit P–1 (FIGS. 2, 4, 5 and 7), an intersection panel unit (not shown), an electrical wall panel unit E providing an electrical outlet 90 therein (FIG. 7A), an electrical wall panel unit E–1 having an electrical outlet 91 and an electrical switch 92 therein (FIG. 7C), a water supply wall panel P–2 (FIG. 7B) having water conduits 80 therein, a window support panel unit W–1 (FIG. 1), a roof panel S–1 (FIG. 3), and a sub-floor panel P–3 (FIG. 4 and 5).

The wall panel unit P-1 (FIGS. 2, 4, 5 and 7), is a rectangular pre-cast slab having a kerf or groove 11 formed in the vertically upwardly extending end walls 10a and 10b (FIGS. 2, 4, 5 and 7), a similar kerf 12 formed in the base edge 10c, and an electrical chase or groove 13 (FIGS. 2, 4, 7 and 8), somewhat wider than the kerfs 11 and 12 to allow passage of the primary electrical conductors 99 (FIG. 8) of the electrical power system of the building B, in the upper edge 10d thereof. Beveled edges 18 (FIG. 7) are formed along the vertically extending end walls 10a and 10b of the wall panel units P-1.

The panel units P are of uniform thickness X (FIG. 7), but may be several preselected standardized heights and widths to allow flexibility in the design and construction planning of the buildings B. The wall panel units P-1 serve as the exterior walls or panels and the interior partitions or walls within the building B.

The corner panel C, the electrical wall panel units E and E-1, the water supply wall panel P-2, and the window support panel unit W-1, each have kerfs 11 and 12 formed in their respective vertical end walls and base edges in a like manner to the kerfs 11 and 12 in the vertical end walls 10a and 10b, and base edge 10c of the wall panel unit P-1, as well as beveled edges 18 along the corners of their end walls.

The corner panel C, the electrical wall panel units E and E-1, and the water supply wall panel P-2 have chases 13 formed in their respective upper edges in a like manner to the electrical chase 13 in the upper edge 10d of the wall panel unit P-1.

The corner panel C (FIG. 7), is an L-shaped member having two wall panels 15a and 15b integrally mounted to each other along a common junction 15c.

A partition intersection panel unit (not shown) is also used and comprises alternatively a T-shaped member having three upright vertically extending panels, having a T-shaped horizontal cross section, and an X-shaped member having four upright vertically extending panels and having a cruciform horizontal cross section. The intersection panel units have kerfs and chases in a like manner to the other panel units P, and are used when the construction pattern or floor plan for the building requires that two or more walls intersect at a certain location.

The sub-floor panels P-3 have kerfs 14 (FIG. 5) in their horizontally extending, longitudinal end walls 14a and 14b thereof, and are mounted to the foundation F along a lower surface 14c, while the floor of the building (not shown) is mounted along an upper surface 14d.

The electrical wall panel unit E-1 (FIG. 7C) has a plurality of sockets or housing 91 and 92 therein, into which electrical switches and outlets (not shown) are inserted, and which are connected through preformed intermediary tubes or chases 91a and 92a in the panel unit E-1, respectively, to the chase 13. An aperture 93a is formed in the upper end of an upright wall 93 of the panel E-1, permitting access to the chase 13 in the upper edge 10d thereof. The electrical wall panel unit E (FIG. 7A) has a socket 90 preformed therein, in which an outlet or switch (not shown) may be mounted, and a preformed intermediary chase 90a connecting the socket 90 to the chase 13.

The water supply wall panel unit P-2 (FIG. 7B) has water conduits 80, preferably lined with copper tubing, therein, and may include, for example, a preformed hot water pipe 80a and a cold water pipe 80b, having flow regulating valves (not shown) therein, connected to operating knobs or faucets mounted to the exterior of the wall panel P-2. If a shower facility is required in the building B by the construction plan, a preformed conduit 80c, connected to the pipes 80a and 80b at a junction 80e, leads to an outlet 80d to which a shower nozzle (not shown) may be mounted. The thickness X of water supply panel unit P-2 may be increased to accommodate the water conduits 80.

The window support panel unit W-1 (FIG. 1), is similar in construction to the panel unit P-1 except that it is somewhat shorter in height to allow mounting of windows thereon along the walls of the building B.

The roof panels S-1 (FIG. 3) are flat, rectangular members preferably joined to each other by splines embedded in kerfs along the end walls as will be discussed below, or by a tongue and groove arrangement, although other joining arrangements for the roof panel units S-1 are easily adapted for use with the present invention. Pre-cast apertures 64 (FIG. 3) are formed in the roof panels S-1 for passage therethrough of metal dowels or other affixing means connecting the roof panels to rafters R or beams T.

The splines N are of prime-coated metal, preferably 16 gauge, and include a base spline 20 (FIGS. 7 and 10A) and an upright spline 25 (FIGS. 7 and 10B). The base spline 20 includes a flat horizontal plate 21 which is horizontally mounted along a lower surface 21a to the foundation F of the building B. A vertical plate 22 is mounted longitudinally to, and extends substantially vertically from, the center line of the upper surface 21b of the horizontal plate 21.

The upright spline 25 (FIG. 10B) is formed by an upright plate 26 which engages the end walls 10a and 10b' (FIG. 9) adjacent panel units along its surfaces 26a and 26b (not shown). The upright plate 26 is mounted longitudinally along, and extending substantially at a right angle from, a center 27c of an upright plate 27. A pair of mounting portions 27a and 27b of the upright plate 27, extending from the center junction 27c with the upright plate 26, are mounted within the kerfs 11 in the end walls 10a and 10b of adjacent panel units (FIG. 9).

The channel members M (FIGS. 10C, 10D and 10E) are metal members U-shaped in cross section and include a longitudinal channel member 30 (FIG. 10C), a T-shaped intersection channel member 31 (FIG. 10D), an L-shaped corner channel member 32 (FIG. 10E), and a cruciform intersection channel member (not shown). Each of the channel members 30, 31 and 32 includes a protective horizontal support member 30a, 31a, 32a, respectively, along which the channel member M is mounted (FIGS. 2, 6 and 8), to the upper edge 10d of the panel units P. A pair of plates 30b and 30c, 31b and 31c, 32b and 32c, respectively, extend downwardly from the outer edges of the protective horizontal support member 30a, 31a and 32a, to hold such support member in place atop the upper edge of the panel unit P (FIGS. 2, 6 and 8), and assist in protecting the electrical conductors 99 (FIG. 8) positioned in such chases from moisture or other damage. The particular configuration of the channel member (30, 31, 32 or cruciform) used will correspond to the particular wall panel unit P to which it is to be mounted.

A plate 30d is removably mounted at a selected position along the plate 30b of channel member 30 to allow access through the aperture 93 in the electrical panel units E and E-1, to the electrical conductors 99 for repair, testing and connection.

Several lengths of the channels members M are preferably provided, to insure that flexibility in design is available and to insure that a junction between channel members does not occur at a junction between panel units P in order to further protect the conductors 99 in the chase 13.

The support beam T (FIG. 1) is a preformed, reinforced concrete beam and is mounted to the upper surface 30a of channel member 30, extending horizontally through the building B as required by the construction specification or pattern to provide support for the roof S.

The rafters R (FIG. 6) are pre-cast concrete beams, reinforced by steel rods 75, which are mounted at a transverse groove or notch 70 formed therein to the upper surface 30a of channel member 30 at preselected locations in the buiding B in accordance with the floor plan or construction pattern of the building B. The rafters R extend upwardly and inwardly from the panel units P, and at a surface 72 engage a like surface 72′ of another rafter R′. A ledge 73 is formed along an upper end 71a of the rafter R and an aperture 74 is preformed through such rafter leading from the ledge 73 to the surface 72. When the surfaces 72 and 72′ of joining rafters R and R′ are correctly engaged and alinged, the apertures 74 and 74′ are in alignment, and a dowel or bolt 78 or other suitable connecting means is passed through such apertures to firmly hold and engage the rafters R and R′ to each other along the surfaces 72 and 72′.

An end 71b of the rafters R may extend downwardly outwardly from the panel units P to form eaves or overhang of the roof, if the construction pattern of the building so requires.

When the construction pattern for the building B requires a flat roof, the rafters R are not used, and suitable horizontally extending support beams (not shown), similar in construction to the beam T, are used to provide roof support for the roof S, and are located in the building as required by the construction pattern. The rafters R or beams have apertures therein (not shown) to hold and receive the dowels passed through corresponding apertures 65 in the roof panels S–1 to hold such roof panels firmly in place.

The windows and window frames and door jambs (not shown) for the building B are standard, commercially available aluminum or steel prime-painted types, having support members or trims similar to the channel members M along the external portions thereof. The trims are suitably dimensioned to firmly engage and enclose the respective end wall and edges of the panel units P between and atop which they are to be mounted in accordance with the construction pattern of the building B.

If the window W or door D (FIG. 1), required according to the construction pattern, is shorter in elevation than the panel units P of the building B, a preformed lintel L (FIG. 1) or sill or header suitably dimensioned to be firmly mounted within the trim atop the window W or door D, and extend to a desired height, is provided. The lintel has kerfs in its respective end wall members to engage the upright splines in adjacent panel units P, and a chase in its upper surface for passage therethrough of electrical conductors 99.

ADHESIVE MASTIC

An epoxy mastic or adhesive caulking A (FIGS. 2, 3, 5 and 7), is utilized in the process of the present invention to firmly and securely mount the foundation F, panel units P, splines N, channel members M, rafters R, roof S and other standardized components of the building B previously discussed with respect to each other. For example, a suitable epoxy adhesive for the process of the present invention is that sold by the H. B. Fuller Company as compound "BC–5160" although other equivalent epoxy adhesives may be utilized.

The mastic A takes its initial set within 10 to 30 minutes (dependent on weather and atmospheric conditions), and subsequently completes its final set after allowing time for a complete wall to be set in place and finally aligned to exact measurements, as will be evident hereafter. The epoxy mastic A forms a bond between adjacent panels, and is as strong as the concrete itself, retaining its resiliency over extended use.

ERECTION PROCESS

In accordance with the construction pattern or specification, the standardized components are numbered in accordance with the sequence in which they are to be erected as specified in the construction pattern, with the components having the lowest number being the first to be erected. In accordance with the technique of numbering the floor plan according to panel numbers, the panels for each plan are sequentially numbered by a chalk number and are assembled for shipment to the construction site. Accordingly, a cargo truck (not shown) is loaded in the Panel Supply yard, so that the roof system S with the highest numbers goes on the bottom of the load, the exterior and interior wall panels P–1 with lower numbers go on the center of the load, and if sub-floor panels P–3 are specified, these receive the lowest numbers and go on the top of the load, so they may be unloaded in the reverse order. Also, the windows W, door jambs, doors, steel splines N, channel members M, along with the containers of epoxy mastic A for joining and caulking, and all ancillary hardware, go with the load for one complete inventory and may be easily checked against a check-list.

Upon the completion of the foundation F, and all plumbing rough-in, as required by the construction plans and epoxy mastic caulking A is placed on the recessed panel ledge 70a, the erection of the building B is ready to begin. The grade around the foundation F should be back-filled and leveled for ease in operating and positioning the truck load of components for unloading around the foundation.

If sub-floor panels P–3 are to be used, the panels are carefully placed (FIGS. 4 and 5) to complete the sub-floor system, in accordance with their chalked numbers and the construction plans. Any rough-in plumbing is in place prior to the beginning of placing of sub-floor. The sub-floor panels P–3 have at least 2″ bearing on foundation F along the ledge 70b.

If floor finishes such as asphalt tile are required by the construction plan to be used, a mastic underlayment of ½″ of Portland cement asphalt mastic is laid. The top surface 14d of the floor deck is primed with one coat of emulsified asphalt at the consistency of thin paint. Approximately one hour later, the underlayment coat composed of one part emulsified asphalt, two parts of Portland cement and 1½ parts of coarse sand, which have been thoroughly mixed, is applied and smoothly troweled to a level surface to receive floor finish.

The erection of the wall system begins at a corner designated as the starting point on the plans (FIG. 7), and epoxy mastic caulking A is placed on the recessed ledge 70a of the perimeter of the foundation F of exterior walls. Immediately following the caulking, the base spline 20 is placed, seated and aligned. After placing and aligning, the metal base spline may be additionally fastened by the use of a suitable gun to shoot nails through the steel splines 20 into the concrete foundation F at designated points.

Thereafter, the wall panel units P–1 are unloaded in accordance with the number sequence from the truck and transported by carriage, crane, trolley or by hand and moved into position for erection. The bottom kerf 12 of the panel, and two vertical side kerfs 11, are caulked with the epoxy mastic A.

The first panel, a corner panel unit C, having the lowest number marked thereon in chalk, is placed in its upright vertical position at the corner. Then an upright spline 25 is embedded in each of the vertical sides containing the epoxy mastic in the kerf 11. The corner unit C is then braced rigidly by cables, brackets, braces or other suitable means, until the length of the whole wall is erected, aligned and completed.

The walls may be erected simultaneously in both directions from the corner C under proper supervision, if sufficient crews are available, for speed of erection.

The next higher numbered panel, a standard flat wall panel P–1, is removed from the truck and caulked with epoxy mastic A on the bottom kerf 12, and kerf 11 along the two vertical end walls 10a and 10b, and positioned on the base spline 20. The panel shall then be shoved tightly up against the corner panel C and aligned to form a true and vertical wall. A rubber mallet (not shown) may be used to properly seat the metal splines 25 in the epoxy mastic A and kerfs 11 of the panels. As each panel unit is properly aligned, it is securely braced into position to allow the mastic A to set.

The upright splines 25 engage the vertical plate 22 of base spline 20 at their lower end and serve as wall stiffeners, and with the epoxy mastic A, form a sealer and moisture barrier. The upright splines 25 do not block passage of the conductors 99 through the chase 13.

As the walls go up in accordance with the construction plan, the first angle steel channel member M is also placed. This may be either an L member (FIG. 10E), or a T member (FIG. 10D), as the need may be, and is designed to be sufficiently long to overlap the joints with the adjoining panels as previously discussed. The required steel top channel 30 is furnished in suitable lengths for ease in placing. This top channel serves as the top plate, a similar manner to those used in the conventional frame construction. As the walls are erected and completed, the L plate (FIG. 10E) and the T plate (FIG. 10D), and the channel 30 are spiked or otherwise affixed to the top of the panel wall at designated locations, by suitable means.

The location and number of all partition walls shall be chalk line outlined and marked on the sub-floor P-3, and then the base splines shall be placed, using epoxy mastic and, if desired, a nail gun to shoot nails into splines, fastening the base spline 20 to the sub-floor P-3. No base spline 20 shall be placed where door openings occur. The interior wall panels P-1 shall be erected, with door openings as indicated on plans and details, in the same manner as shown for exterior wall panels P-1, with the erection process continuing in accordance with the sequence of numbers chalked on corresponding panels P and portions of the sub-floor upon which the panels P are to be mounted.

The procedure of erection of wall panel units P is followed, as described above, until the point is reached where a partition wall intercepts the exterior wall. At this point, the number chalked on the sub-floor will indicate a T or intersection panel unit is to be removed from the truck, caulked, positioned in the wall and properly aligned, and securely braced.

Where window openings W are shown on plans, panels W-1 allowing for such openings will be mounted to the sub-floor. Windows of the specified sizes shall be prepared and positioned in the openings W. Smaller fins may be used in the place of splines in the window spaces, and the fins shall be embedded in the epoxy mastic caulked kerf openings 11 and 12, as the window unit is positioned and aligned.

Any required sills, headers, lintels and the like are thereafter installed in accordance with construction plan details.

For door openings, pre-assembled, prime-painted steel or aluminum door bucks or jambs with cased trim are used, affording a trimmed door opening. The door bucks (designed for masonry construction) are fastened in place securely at designated places for a plumb and neat final setting, ready for the prefitted doors with hardware mounted, which are mounted in place by dropping pins of the door hinges in the hinges in the jambs.

The proper electrical switches and outlets are installed for the electrical system in specified panels E and E-1, as such panels are being preformed as indicated on electrical system plans. An electrician develops the service progressively as the panel erection work proceeds. As the panel walls P are being erected, the electrician places the required electrical wires 99 in the chases 13, 90a, 92a and 93a, provided in the panels E and E-1, making and testing his connections, outlets, switches, and circuits before the channel member M goes in place and is fastened down.

Wherever possible, construction plans should be prepared whereby the kitchen and bathroom are back to back for economical plumbing, piping for stacks, and hot and cold water lines. Flexible copper tubing of proper sizes with attached fittings, as detailed on mechanical plan, is preferably incorporated in special panels P-2 for plumbing features.

Special water supply panels P-2 with plumbing stack, copper tubing for hot and cold water and shower feature are used where indicated on construction plans. A plumber in attendance as the walls are being erected and roof panels placed to complete his connection work as the installation proceeds.

Upon completion of all wall systems, and caulking of the vertical grooves along the beveled edges 18 thereof, with all plumbing runs, stacks, etc., and electrical work accomplished and tested, channel member M in place and properly secured, the Roof panel system shall then be placed.

The roof panels S-1 may be handled from the truck to the roof area by hand or mechanical equipment to protect the panels. The proper panels are used as designated by the construction plan. Epoxy mastic A is applied on top of the channel member M as the rafters R or beams are placed. The roof panels S-1 are then placed on the rafters R or beams. After all panels S-1 for roof S are in place and observed from the under side and inspected, with all eave edges true and in alignment, proper spiking down or doweling of each panel S-1 at appropriate points is accomplished.

Upon completion of all nailing, finishing of electrical work, plumbing work, etc., caulking of all joints is done with epoxy mastic A.

Any trim, such as metal drip strips, lead collars, and flashings may then be added, completed and inspected.

The above outlined erection procedure is applicable for flat, semi-flat and contemporary roof systems. Gable type roofs, as may be detailed and specified, are erected in the same manner, except there may be, in accordance with plans and specifications, roof supporting beams for open cathedral ceilings, and/or gable roof designs. The walls forming gable ends (not shown) are cast to pattern to provide the proper pitch, as shown and required in construction plan details.

It should be noted that each of the panels P is a load-bearing wall acceptable to receive roof panels S-1. The roof panels S-1 should, however, have a minimum bearing of approximately 2 inches on wall panels P.

Upon completion of the erection process, interior and exterior finishes may thereupon be applied in accordance with architectural plans and specifications.

In areas where temperatures go below 20° F., the insulation of the building B is improved by the application of 1″ Styrofoam insulation sheets to the inside side of all exterior wall panels P. Suitable finishes can be applied directly to such Styrofoam insulation.

Careful planning, simplification of construction, the development of this new and improved building method for prefabricated components, standardized modular coordination, and permanence are factors combined in this system to achieve the greatest economy in construction. It should be noted that a minimum of skilled labor is required in the erection of these buildings, due to the simplified process and numbering scheme of the present invention.

The foregoing disclosure and description of the invention are illustrative and explanatory thereof, and various changes in the size, shape, and materials as well as in the details of the illustrated construction may be made without departing from the spirit of the invention.

What is claimed is:

1. A method of erecting a building by assembling a plurality of standardized, pre-cast panels, containing kerfs or channels in the edges, onto supporting splines in a pre-determined construction plan or pattern on a foundation upon which the building is to be erected, comprising:

(a) applying an adhesive mastic to a pre-determined corner of the foundation;

(b) mounting a base spline in the adhesive mastic;
(c) positioning the base spline on the foundation in alignment with the floor plan of the construction pattern;
(d) applying an adhesive mastic caulking to the kerf in the base edge of a corner panel unit;
(e) applying an adhesive mastic caulking to the kerfs in the end walls of the corner panel unit;
(f) mounting the corner panel unit along the base edge onto the base spline;
(g) supplying a rigid bracing to support the corner panel unit;
(h) embedding upright splines in the kerfs in the end walls of the corner panel unit;
(i) applying an adhesive mastic caulking to the end walls in the base edge of the wall panel unit;
(k) mounting the wall panel unit along the base edge onto the base spline and along an end wall onto the upright spline in alignment with the walls of the corner panel unit;
(l) supplying a bracing support to the wall panel unit;
(m) applying adhesive mastic in a path along the foundation according to the floor plan of the construction pattern;
(n) mounting base splines along the path of application of the mastic;
(o) positioning the base splines on the foundation in alignment with the floor plan;
(p) applying adhesive mastic to the base edge and end walls of additional panels, corner panel units, wall panel units, and partition intersection units; and
(q) mounting the additional corner panel units, wall panel units, and partition intersection units to the base splines, and to the upright splines of previously mounted panel units, in accordance with the floor plan of the construction pattern.

2. The method of claim 1, further including the steps of placing a roof on the building by mounting panels onto rafters or beams which are mounted to supporting channel members atop the wall units, comprising:
(a) applying adhesive mastic to the upper edges of the panel units;
(b) mounting the supporting channel members on the upper edges of the panel units;
(c) applying adhesive mastic to the upper surfaces of the supporting channel members;
(d) mounting the rafters to the upper surfaces of the supporting channel members;
(e) mounting the rafters to each other in pairs at the ends thereof opposite the supporting channel members;
(f) mounting the roof panels to the rafters; and
(g) applying a caulking mastic to the joints between the panels.

3. The method of claim 1, further including the steps of providing an electrical power supply system in the building by establishing electrical outlets in preselected electrical panel units, comprising:

(a) inserting primary electrical conductors in chases formed in the upper edges of the panel units as the panel units are being mounted to the foundation;
(b) inserting intermediate electrical conductors through intermediary chases formed in preselected electrical panel units;
(c) establishing electrical connection between the primary electrical conductors and the intermediate electrical conductors;
(d) inserting electrical outlets in preformed housings in the preselected electrical panel; and
(e) establishing electrical connection between the intermediate electrical conductors and the electrical outlets.

4. The method of claim 1, further including the steps of establishing a connection between the water supply and sewage system of the locality in which the building is located by forming hydraulic connection between the water supply system and water outlets in preselected water supply panel units which have tubing therein, as the preselected water supply panel units are being mounted to the foundation.

5. The method of claim 1, further including the step of providing windows in preselected window holding wall units of the building, comprising:
(a) applying an adhesive mastic caulking along the edges of the preselected window wall units; and
(b) mounting the windows along the adhesive coated edges to the window wall units.

6. The method of claim 1, further including the step of providing openings for doors at preselected locations in the building according to the construction pattern, comprising:
(a) mounting a metal door jamb, with a trim at the top and hinges along one vertical wall at the preselected location to the end walls of adjacent wall panel units; and
(b) mounting a lintel atop the trim in the door jamb between the end walls of adjacent wall panel units.

7. The method of claim 1, further including the step of providing a sub-floor for the building composed of a plurality of sub-floor panels having kerfs in longitudinal end walls thereof, comprising:
(a) applying an adhesive mastic along the foundation of the building;
(b) applying an adhesive mastic to the kerfs in the longitudinal end walls of the sub-floor panels;
(c) embedding splines in the kerfs in the sub-floor panels; and
(d) mounting the sub-floor panels along the lower surfaces thereof to the mastic coated portion of the foundation and along the longitudinal end walls to the splines of adjacent sub-floor panels.

References Cited
UNITED STATES PATENTS

| | | | |
|---|---|---|---|
| 3,193,973 | 7/1965 | Lee et al. | 52—747 |
| 3,553,923 | 1/1971 | Dompas | 52—747 |

PATRICK D. LAWSON, Primary Examiner